United States Patent [19]

Habich et al.

[11] 3,859,662

[45] Jan. 7, 1975

[54] TRANSDUCER TRACK SELECTION APPARATUS

[75] Inventors: Adolph Broadus Habich; John Wesley Ward, Jr., both of Austin, Tex.

[73] Assignee: International Business Machines Corporation, Armonk, N.Y.

[22] Filed: May 30, 1973

[21] Appl. No.: 365,308

[52] U.S. Cl. .................................. 360/106, 360/109

[51] Int. Cl. .............................................. G11b 5/54

[58] Field of Search ............................. 360/106, 109

[56] References Cited

UNITED STATES PATENTS

| | | | |
|---|---|---|---|
| 3,200,384 | 8/1965 | Welsh | 360/106 |
| 3,588,119 | 6/1971 | Cater et al. | 360/106 |
| 3,631,419 | 12/1971 | Ho | 360/106 |
| 3,645,538 | 2/1972 | Zimmermann | 360/106 |
| 3,730,532 | 5/1973 | Miyamoto | 360/106 |

*Primary Examiner*—Stuart N. Hecker
*Attorney, Agent, or Firm*—Douglas H. Lefeve

[57] ABSTRACT

A transducer track selection apparatus is disclosed enabling an operator selected coarse adjustment of a desired transducer position to be translated into a fine adjustment to a precise track location. The operator actuated coarse adjustment portion of the invention includes a track selector knob having a plurality of teeth radially positioned along the circumference thereof. These teeth are engageable with an externally mounted detent tooth so that the knob may be coarsely adjusted and held in one of the plurality of positions. Also connected to the knob is a shaft having a windlass rigidity mounted thereon. A cable in relatively high tension is wrapped around the windlass for movement thereby and is also connected to a transducer carrier, such as a magnetic head carrier, through a position compensator so that rotational movement of the coarse adjustment knob is translated into movement of the transducer, such as a maganetic head. A toothed rack is engageable with a single tooth on the head carrier and is disengaged from the head carrier by depression of the coarse selector knob against a spring bias, enabling rotation of the knob for making the coarse selection of desired head position. Upon release of the knob the toothed rack engages the single tooth on the head carrier providing a precise location of the magnetic head.

10 Claims, 2 Drawing Figures

TRANSDUCER TRACK SELECTION APPARATUS

BACKGROUND OF THE INVENTION

1. Field of the Invention

This invention relates to tranducer track selection and more particularly to a track selection apparatus which translates a coarse, operator selected input representative of desired track location into a precise track location of a tranducer.

2. Description of the Prior Art

A variety of devices have been proposed in the prior art to enable movement of tranducers, such as lateral movement of a magnetic head across a magnetic tape or radial movement of a magnetic head along a magnetic disc. Representative of the closest known prior art are U.S. Pat. No. 3,243,189, entitled "Electrical Indicating Means for Tape Recording Machines" and *IBM Technical Disclosure Bulletin*, Vol. 14, No. 6, Pages 1802 – 1804, entitled "Rotary Scan Mechanism." The devices disclosed in both of these prior art teachings include a spring loaded shaft which is rigidly attached to a knob. Depression of the knob by the operator against the spring bias causes disengagement of a magnetic head carrier from a lead screw. This knob depression also provides a mechanical connection between the knob and the magnetic head so that translation of the head is effected by knob rotation. Upon translating the head and releasing the knob by the operator, the head carrier again becomes engageable with the lead screw, whereupon lead screw rotation causes further translation of the magnetic head carrier.

Since the head carrier is engaged to the lead screw by means of a pawl or half-nut, the operator is unable to predict a magnetic head location at which the pawl or half-nut will positively engage the lead screw. This is so because various track selection operations may be performed at different angular lead screw positions. Usually, an operator selection is made and if the half-nut or pawl does not positively engage the lead screw, positive engagement will occur after lead screw rotation begins.

In applications wherein a higher degree of accuracy in magnetic head positioning is required, it was found that certain aspects of the above prior art apparatus were unsuitable. For example, it was deemed necessary that the head carrier become positively engaged with the lead screw, or other find adjustment device, upon the completion of operator selection. Further, absolute repeatability in track positioning was deemed necessary. Such repeatability would be impossible if a lead screw were used for the fine positioning of the head if positioning operations were allowed to occur at various different angular orientations of the lead screw or if the threads of the lead screw were such as to allow an engagement of the pawl to occur at a high portion of the lead screw.

It would, therefore, be advantageous to provide a transducer track selection apparatus which would overcome these undesirable features of prior art transducer track selection devices, thereby offering repeatability in track selection and precise, positive engagement of the transducer carrier at the conclusion of a track selection operation.

SUMMARY OF THE INVENTION

The above advantages of repeatability and precise transducer track selection are achieved by the disclosed apparatus, enabling an operator selected coarse adjustment of a desired transducer position to be translated into a fine adjustment of a precise track location. The operator actuated coarse adjustment portion of the invention includes a track selector knob having a plurality of teeth radially positioned along the circumference thereof. These teeth are engageable with an externally mounted detent tooth so that the knob may be coarsely adjusted and held in one of a plurality of positions. Also, connected to the knob is a shaft having a windlass rigidly mounted thereon. A cable in relatively high tension in wrapped around the windlass for movement thereby and is also connected to a transducer carrier, such as a magnetic head carrier, through a position compensator so that rotational movement of the adjustment knob provides movement of the transducer, such as a magnetic head. A toothed rack is engageable with a single tooth on the head carrier. The head carrier is attached to the position compensator with a relatively low spring force so that slight lateral movement of the head carrier can occur to aid in positively engaging the single tooth on the head carrier with the toothed rack for precise head positioning. This becomes helpful for positive engagement when misalignment due to component tolerances would otherwise prevent positive engagement.

The toothed rack is also connected to the coarse selector knob, such that depression of the coarse selector knob against a spring bias disengages the toothed rack from the magnetic head carrier so that the operator may rotate the knob to make a coarse selection of desired track location. Upon release of the knob the toothed rack engages a single tooth on the head carrier providing a precise location of the magnetic head.

Since a toothed rack is used which is movable laterally and not longitudinally, unlike a rotatable lead screw, repeatability is achieved by the operator in selecting magnetic track locations. Further, the position compensator, to which is mounted the magnetic head carrier and head, allows positive positioning of the head at the completion of each track selection operation.

It will be obvious to those skilled in the art that the discussion above and below, in which a magnetic head is used as an example of a transducer, is equally applicable to other types of transducers known in the art, such as optical scanners.

The foregoing and other objects, features and advantages of the invention will be apparent from the following more particular description of a preferred embodiment of the invention, as illustrated in the accompanying drawing.

DESCRIPTION OF THE PREFERRED EMBODIMENT

Figure 1:
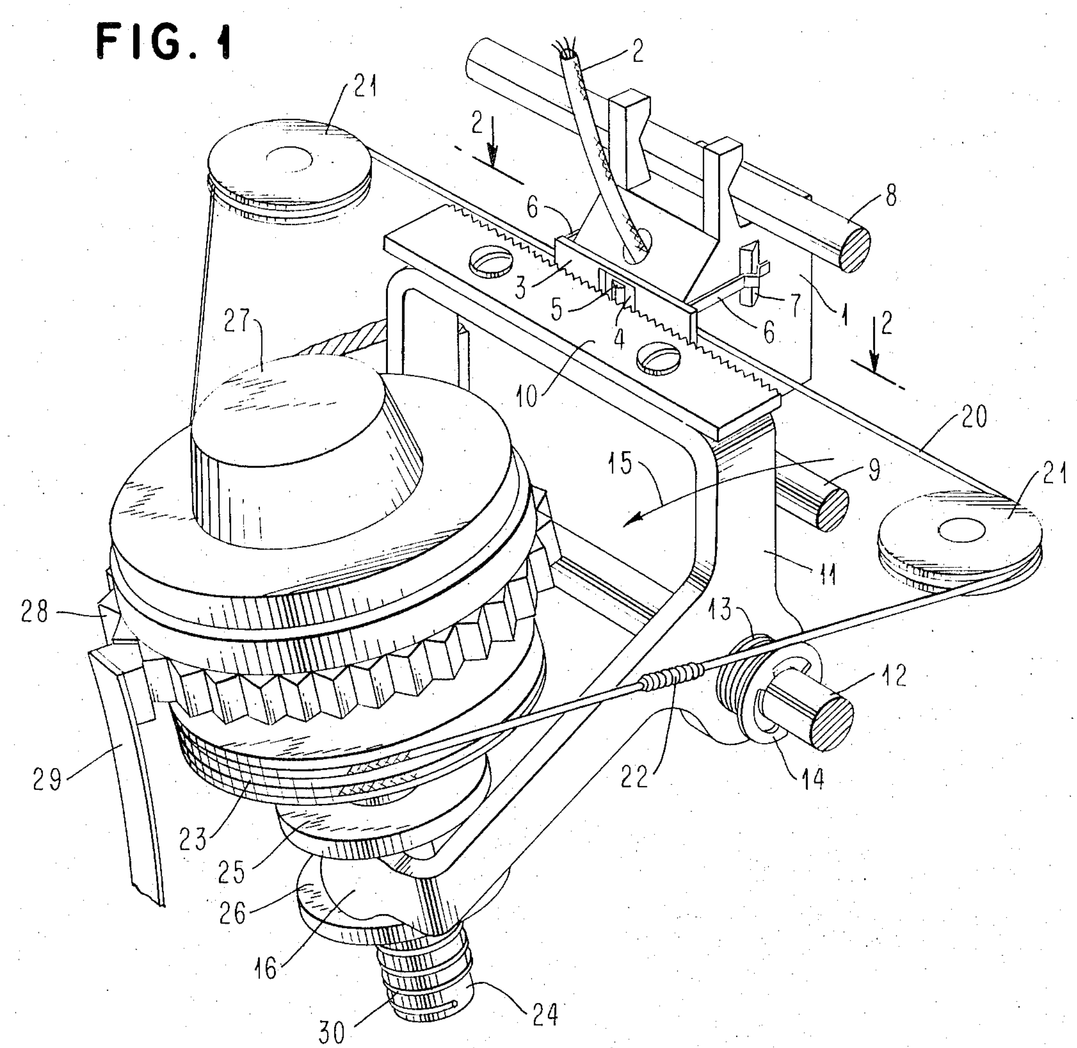
FIG. 1 is a perspective view of the transducer track selection apparatus of this invention.

Referring now to FIG. 1, a perspective view of the transducer track selection apparatus of this invention is shown. A knob 27 has a plurality of teeth 28 radially disposed along its circumference. A spring detent 29 has a lower portion fixedly attached to an external surface (not shown). Spring detent 29 is biased toward the center of knob 27 so that it engages teeth 28. Rigidly attached to knob 27 is shaft 24 to which windlass 23 and washers 25 and 26 are also rigidly attached. Knob 27 is biased upward by a force exerted on washer 26 by spring 30.

Figure 2:
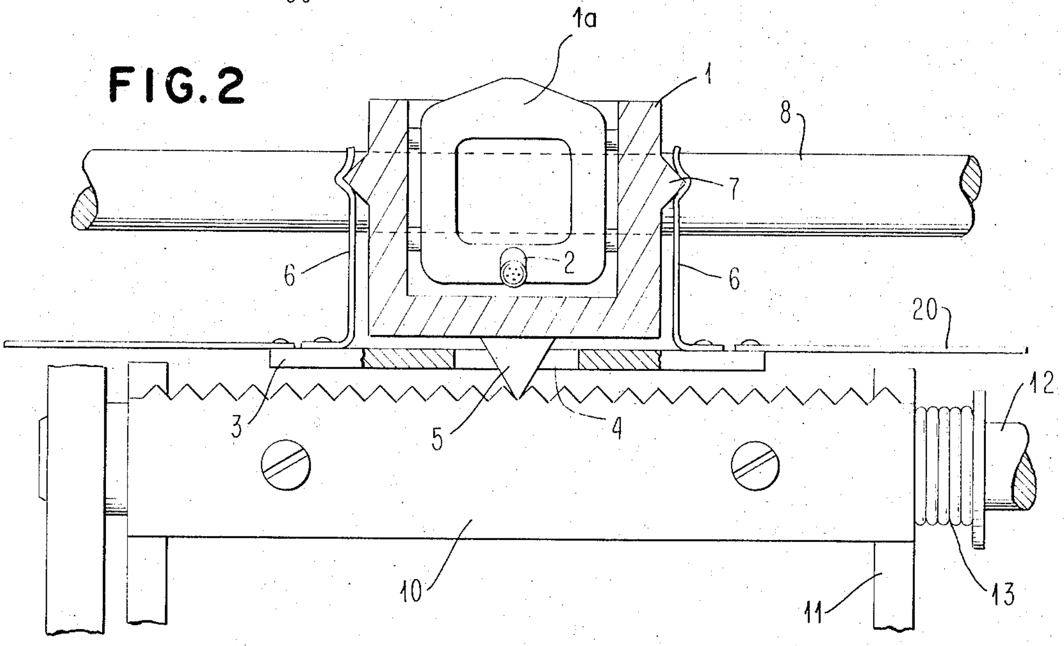
FIG. 2 is a portion of a top view of the transducer track selection apparatus of this invention which shows in detail the position compensator for the tranducer carrier.

The above elements form the coarse adjustment portion of the transducer track selection apparatus of this invention. Referring now to FIGS. 1 and 2, the elements comprising the fine adjustment portion of the track selection apparatus of this invention include transducer carrier or head carrier 1 which is laterally movable along smooth shafts 8 and 9. Transducer or magnetic head 1a is rigidly mounted within head carrier 1 and includes cable 2 for conducting electrical reading and writing signals from a read-recorder (not shown) to magnetic head 1a. On opposite sides of head carrier 1 are convex protrusions 7 which engage spring clips 6 of position compensator 3. Head carrier 1 also includes tooth 5 which extends rearwardly therefrom through cut-out hole 4 in compensator 3 for engagement with teeth of rack 10. The operation of position compensator 3 will be described in greater detail below.

One connection between the coarse and find adjustment portions of the apparatus of this invention includes cable 20 which is guided by pulleys 21 and extends around windlass 23 so that movement of knob 27 causes movement of cable 20. Cable 20 is rigidly connected to position compensator 3 and is maintained in relatively high tension by spring 22. The force provided by spring 22 must be greater than the force required to deflect spring clips 6, as will be discussed in greater detail below.

Another connection of the coarse and fine adjustment portions of the track selection apparatus of this invention is provided by yoke 11 which is mounted for pivotal movement about fixed shaft 12. Yoke 11 is retained on shaft 12 by spring 13 and clip 14. Rack 10 of the fine adjustment portion of the apparatus is fixedly attached to yoke 11. Lever 16 of yoke 11 is engageable by washers 25 and 26 of the coarse adjustment portion of the track selection apparatus.

To perform a track selection operation, the operator depresses knob 27. This depression causes a downward axial movement of shaft 24 so that washer 25 engages lever 16 of yoke 11 to cause a slight rotation of yoke 11 in the direction indicated by arrow 15. This movement of yoke 11 in the direction of the arrow 15 disengages rack 10 from tooth 5 of head carrier 1. While holding knob 27 depressed, the operator may then rotate knob 27 through one or more detents provided by spring detent 29 and teeth 28. Rotational movement of knob 27 by the operator causes similar rotational movement of windlass 23, thereby causing linear movement of the several portions of cable 20. Because yoke 11 has been rotated in the direction of arrow 15, tooth 5 of head carrier 1 remains disengaged from rack 10 so that movement of cable 20 causes movement of position compensator 3 and, in turn, movement of head carrier 1 and magnetic head 1a. A coarse adjustment of the magnetic head, therefore, is provided by the operator's rotation of knob 27 with teeth 28 and spring detent 29 providing a coarse indication to the operator of various magnetic track locations and in turn, a coarse positioning of magnetic head 1a. Because of backlash which may occur in the connecting means including cable 23 and pulleys 21, however, a final precise head positioning is necessary to insure a precise track location of the magnetic head.

Such a final positioning occurs upon the release by the operator of knob 27. When the operator releases knob 27 the bias provided by spring 30 against the lower surface of washer 26 drives washer 26, shaft 24, and all elements connected thereto, upward. The upper surface of washer 26 contacts lever 16 which causes rotation of yoke 11 in a direction opposite that indicated by arrow 15. This movement of yoke 11 causes rack 10, which is fixedly attached thereto, to engage tooth 5 of head carrier 1 to provide a final, precise adjustment of head carrier 1 and magnetic head 1a.

To minimize backlash in the cable system it has been found necessary to maintain a relatively high tension in cable 20 by spring 22. Without resorting to prohibitively expensive manufacturing tolerances, however, a slight amount of backlash may, nevertheless, occasionally occur in the cable system. During the coarse portion of a magnetic track selection, and while knob 27 remains depressed, such backlash in the cable system may result in a slight misalignment of tooth 5 and two adjacent teeth of rack 10, even though two adjacent ones of teeth 28 are positively engaging spring detent 29. If cable 20 were rigidly attached to head carrier 1, eliminating the utilization of position compensator 3, when knob 27 was released rack 10 would not positively engage tooth 5 at a bottom-most position between two of the teeth on rack 10. This lack of positive engagement would occur because cable 20 is maintained in relatively high tension. The result of this lack of positive engagement would be an imprecise track selection operation such that data might be erroneously written onto or read from the magnetic media. The problem could not be solved by loosening cable 20 since this would result in a greater tendency toward backlash which, after multiple track selection operations, might result in the positioning of the magnetic head at an entirely different position than that desired by the operator. Position compensator 3, however, is provided to solve this problem.

Instead of rigidly attaching cable 20 to head carrier 1, as proposed above, cable 20 is rigidly attached to position compensator 3. Spring clips 6 of compensator 3, which engage head carrier 1, are of relatively low tension. When rack 10 is disengaged from tooth 5 (by a depression of knob 27) head carrier 1 moves along with position compensator 3 as if it were rigidly attached to cable 20. When, however, knob 27 is released, causing rack 10 to engage tooth 5, head carrier 1 is movable against the relatively low spring bias of spring clips 6 on compensator 3, so that tooth 5 on head carrier 1 may then be engaged into the bottom of the groove formed by two of the teeth on rack 10. In this manner, when the operator releases knob 27, a positive, final, and precise track selection is always assured. Naturally, however, the spring force provided by spring clips 6 must be large enough so that lateral movement of the head carrier 1 on shafts 8 and 9 is essentially unaffected by friction encountered in moving the head carrier across the shafts.

In summary, transducer track selection apparatus has been disclosed which enables an operator to coarsely adjust a transducer to a desired track position. Upon release of the knob, a fine adjustment mechanism becomes operative to positively and precisely position the transducer into the desired track location. The operator can repeatedly select desired track locations with accuracy and is always assured, upon release of the selection knob, that the transducer is positively positioned for error-free recording or reading of a media. It is recognized that the device may be readily utilized with a variety of types of recording media including, but not limited to, magnetic cards, tapes, tape loops, belts, and discs. Further, although the invention has been described for use in magnetic head positioning, it will be understood by those skilled in the art that other types of transducers may be positioned by this invention, such as optical scanners capable of recognizing optical coding encoded upon a variety of media.

While the invention has been particularly shown and described with reference to a preferred embodiment thereof, it will be understood by those skilled in the art that various changes in form and details may be made therein without departing from the spirit and scope of this invention. For example, although the invention has been described in connection with a manual, operator performed coarse adjustment for magnetic track selection, it will be understood by those skilled in the art that the manual functions described may be readily automated by mechanical and electro-mechanical components such as solenoids, motors, shafts, gears, and cams.

What is claimed is:

1. A transducer track selection apparatus comprising:

means for selecting and holding a coarse adjustment representative of a desired particular one of a plurality of track positions of said transducer;

means for connecting said said selecting and holding means to said transducer;

means engageable with said transducer for providing a fine adjustment of said transducer; and means connected to said fine adjustment means and engageable with said selecting and holding means for disengaging said fine adjustment means from said transducer during movement of said selecting and holding means, said transducer engaging said fine adjustment means at the completion of each track selection.

2. The transducer track selection apparatus of claim 1 wherein said selection and holding means further comprises rotatable means having radially positioned teeth along an edge thereof and detent means for engaging said teeth.

3. The transducer track selection apparatus of claim 2 wherein said selecting and holding means further comprises shaft means connected to said rotatable means and to said fine adjustment means whereby engagement of said fine adjustment means with said transducer is provided by axial movement of said rotatable means and said shaft means.

4. The transducer selection apparatus of claim 3 wherein said selecting and holding means further comprises a windlass means rigidly attached to said shaft means.

5. The transducer track selection apparatus of claim 4 wherein said connection means further comprises a cable means engageable with said windlass means and said transducer.

6. The transducer track selection apparatus of claim 5 wherein said connecting means further comprises a spring means interposed in said cable means for maintaining said cable means in relatively high tension.

7. The transducer track selection apparatus of claim 6 further comprising compensation means interposed between said cable means and said transducer, said transducer being spring biased in relatively low tension by said compensation means to substantially follow the movement of said compensation means.

8. The transducer track selection apparatus of claim 7 wherein said fine adjustment means further comprises a toothed rack.

9. The transducer track selection apparatus of claim 8 further comprising transducer carrier means having a tooth engageable with said rack, said transducer carrier means being interposed between said transducer and said compensation means with said transducer being rigidly attached to said transducer carrier means and said transducer carrier means being movable with said compensation means.

10. The transducer track selection apparatus of claim 9 wherein said transducer further comprises a magnetic head.

* * * * *